(12) United States Patent
Park et al.

(10) Patent No.: US 11,409,606 B2
(45) Date of Patent: Aug. 9, 2022

(54) APPARATUS AND METHOD FOR HANDLING A FIRMWARE ERROR IN OPERATION OF A MEMORY SYSTEM

(71) Applicant: SK hynix Inc., Gyeonggi-do (KR)

(72) Inventors: Sung-Jin Park, Seoul (KR); Dong-Hyun Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 199 days.

(21) Appl. No.: 16/837,846

(22) Filed: Apr. 1, 2020

(65) Prior Publication Data

US 2021/0064471 A1 Mar. 4, 2021

(30) Foreign Application Priority Data

Aug. 26, 2019 (KR) .......................... 10-2019-0104320

(51) Int. Cl.
| | |
|---|---|
| *G06F 11/00* | (2006.01) |
| *G06F 11/14* | (2006.01) |
| *G06F 8/61* | (2018.01) |
| *G06F 9/445* | (2018.01) |

(52) U.S. Cl.
CPC ............ *G06F 11/1433* (2013.01); *G06F 8/61* (2013.01); *G06F 9/44557* (2013.01); *G06F 2201/805* (2013.01)

(58) Field of Classification Search
CPC ......................... G06F 11/1433; G06F 11/1004
See application file for complete search history.

(56) References Cited

U.S. PATENT DOCUMENTS

| | | | |
|---|---|---|---|
| 5,388,267 A | 2/1995 | Chan et al. | |
| 8,341,332 B2 | 12/2012 | Ma et al. | |
| 9,047,191 B2 | 6/2015 | Bueb et al. | |
| 2015/0067318 A1 | 3/2015 | Henry et al. | |
| 2018/0067800 A1* | 3/2018 | Gusev | G06F 3/064 |

* cited by examiner

*Primary Examiner* — Philip Guyton
(74) *Attorney, Agent, or Firm* — IP & T Group LLP

(57) ABSTRACT

A memory system includes a memory device including plural non-volatile memory cells storing firmware and a controller configured to load the firmware in a volatile memory and employ a plurality of cores, each capable of performing an operation based on the firmware. A core, which is in a standby state or an idle state between the plurality of cores, is configured to check whether an error has occurred in the volatile memory in which the firmware is loaded.

16 Claims, 12 Drawing Sheets

FIG. 7

| MS000 | MS001 | MS002 | MS003 |
|---|---|---|---|
| MS004 | MS005 | MS006 | MS007 |
| : | : | : | : |
| MS100 | MS101 | MS102 | MS103 |
| MS104 | MS105 | MS106 | MS107 |
| MS108 | MS109 | MS110 | MS111 |
| : | : | : | : |
| MS200 | MS201 | MS202 | MS203 |
| MS204 | MS205 | MS206 | MS207 |
| MS208 | MS209 | MS210 | MS211 |
| MS212 | MS213 | MS214 | MS215 |
| : | : | : | : |

1ST REGION ALLOCATED FOR 1ST CORE: MS000–MS101 (and partially MS100, MS101)

2ND REGION ALLOCATED FOR 2ND CORE: MS102–MS203

3RD REGION ALLOCATED FOR 3RD CORE: MS204–MS215 ...

APPARATUS AND METHOD FOR HANDLING A FIRMWARE ERROR IN OPERATION OF A MEMORY SYSTEM

CROSS-REFERENCE TO RELATED APPLICATION

This patent application claims to the benefit of Korean Patent Application No. 10-2019-0104320, filed on Aug. 26, 2019, the entire disclosure of which is incorporated herein by reference.

TECHNICAL FIELD

An embodiment of this disclosure relates to a memory system, and more particularly, to a method and apparatus for handling a firmware error, while the memory system operates, to avoid malfunction of the memory system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device embodied as a nonvolatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the figures, and wherein:

FIG. 7 illustrates a memory included in, or engaged with, a controller according to another embodiment of the disclosure;

Figure 1:
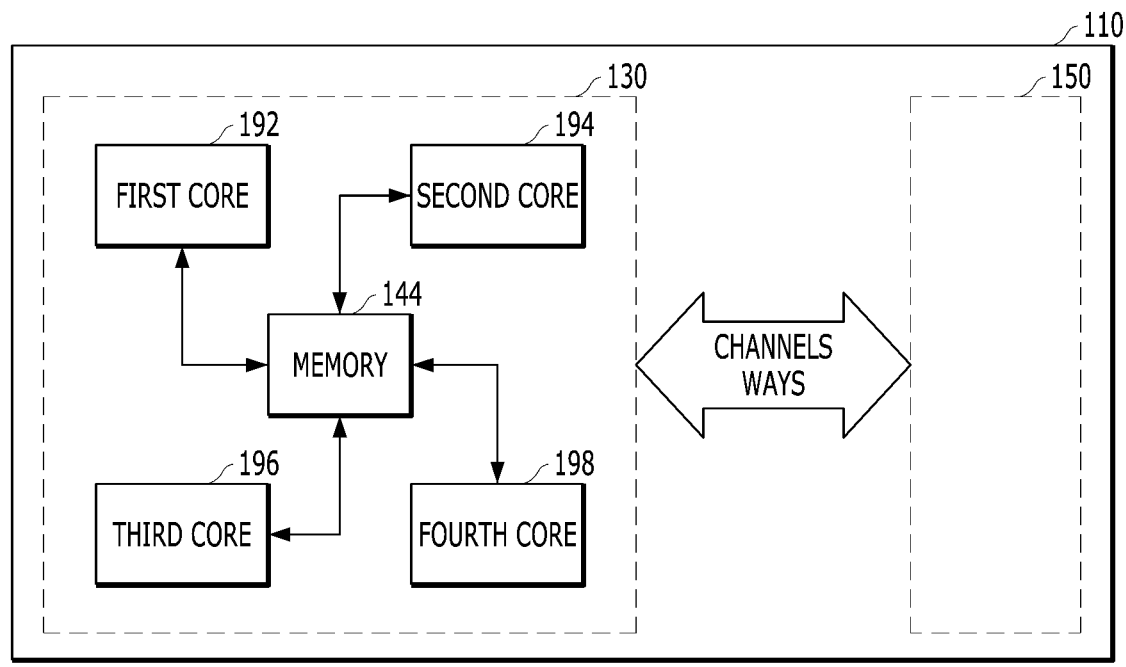
FIG. 1 illustrates a memory system in accordance with an embodiment of the disclosure.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In this disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Further, this term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the disclosure may provide a data process system and a method for operating the data processing system, which includes components and resources such as a memory system and a host and is capable of dynamically allocating plural data paths used for data communication between the components based on usages of the components and the availability of the resources.

According to an embodiment of the disclosure, an apparatus and a method may check whether an error has occurred in firmware or other code, which is loaded in a volatile memory and executed or used by a plurality of cores, based on operation states of the plurality of cores that perform controller operations in a memory system, change an operation state of the memory system if an error is found, notify a host of the changed operation state, and perform a reset operation in response to a reset command inputted from the host. The reset command may be transmitted by the memory system in response to an operation state of the memory system. This procedure may avoid malfunction of the memory system or reduce a possibility that the memory system will attempt to operate with an error.

Further, an embodiment of the disclosure may provide a method or an apparatus which can reduce or avoid occurrence of operational latency caused by resources spent on finding an error in a volatile memory that supports operations performed by a plurality of cores during an operation of the memory system.

In addition, an embodiment of the disclosure may provide a method or an apparatus which can detect an error in a unit cell of a cache memory disposed in a highly integrated processor, recover the error throughout a correction or a reset operation, and reduce malfunction that may be occurred due to the error. The method or the apparatus can enhance or improve operational stability or reliability of the memory system.

In an embodiment, a memory system may include a memory device including plural non-volatile memory cells storing firmware; and a controller configured to load the firmware in a volatile memory and employ a plurality of cores, each capable of performing an operation based on the firmware. A core in a standby state or an idle state may be configured to check whether an error has occurred in the volatile memory loaded with the firmware.

By way of example but not limitation, the controller may be configured to stop or halt the operation, which is performed by at least one core, when the error is found and change an operation state showing that the operation is stopped or halt, and notify a host of the changed operation state.

The controller may be configured to re-load the firmware in the volatile memory from the memory device in response to a reset command entered from the host.

The controller may be configured to allot regions in the volatile memory, which are required by the plurality of cores individually, perform a partial error check to some of the regions through a core in the standby state, collect a result of the partial error check to determine whether the error is occurred in the volatile memory through a core in the idle state, and change an operation state based on whether the error is occurred to notify a changed operation state to a host.

Among the plurality of cores, a core in the standby state may be configured to perform checksum on some of the firmware stored in the volatile memory and store a first result of the checksum.

Among the plurality of cores, a core in the idle status may be configured to perform the checksum on a part of the firmware in which the core in the standby state does not perform the checksum, and store a second result of the checksum performed on the part of the firmware. The core in the idle state may be configured to compare the first and second results with a reference to determine whether the error is occurred.

The controller may be configured to stop an operation to check whether an error has occurred on the firmware when there is an input associated with a data input/output operation to the core in the standby state or the idle state.

The core in the standby state or the idle state may be configured to perform checksum on a particular region of the firmware and store a result of the checksum and information indicating the region of the firmware on which the checksum has been performed.

When there are multiple cores in the standby state or the idle state, the cores individually perform checksum on different parts of the firmware to store a result of the checksum.

The controller may include error check circuitry configured to monitor states of the plurality of cores, and to stop an operation performed by the plurality of cores in response to an error detected in the plurality of cores.

In another embodiment, a method for operating a memory system may include loading firmware, which is stored in a memory device including plural non-volatile memory cells, in a volatile memory; employing a plurality of cores performing an operation based on the firmware loaded in the volatile memory; and using a core in a standby state or an idle state, among the plurality of cores, to check whether an error has occurred in the volatile memory loaded with the firmware.

By way of example but not limitation, the method may further include changing an operation state such that the operation is stopped, based on the error; and notifying a host of the changed operation state.

The method may further include re-loading the firmware from the memory device in response to a reset command received from the host.

The method may further include allotting regions in the volatile memory, which are required by the plurality of cores individually; and changing an operation state based on whether the error has occurred to notify a host of the changed operation state. The method may include performing an error check to some but not all of the regions through a core in the standby state; and evaluating a result of the error check to determine whether the error has occurred in the volatile memory through a core in the idle state.

The method may include using a core in the standby state to perform checksum on some of the firmware stored in the volatile memory; and storing a first result of the checksum.

The method may include using a core in the idle state to perform the checksum on a part of the firmware in which the core in the standby state does not perform the checksum, and to store a second result of the checksum performed on the part of the firmware; and using the core in the idle state to compare the first and second results with a reference to determine whether the error has occurred.

The method may further include stopping an operation to check whether an error has occurred on the firmware when there is an input associated with a data input/output operation to the core in the standby state or the idle state.

The method may further include using the core in the standby state or the idle state, among the plurality of cores, to perform checksum on a particular region of the firmware and store a result of the checksum and location information indicating a region of the firmware on which the checksum has been performed.

The method may further include, when there are cores in the standby state or the idle state, using the cores to individually perform checksum on different parts of the firmware to store a result of the checksum.

In another embodiment, at least one non-transitory computer readable storage medium configured to store instructions that, when executed by at least one processor, cause the at least one processor to carry out steps that include loading firmware, which is stored in a memory device including plural non-volatile memory cells, in a volatile memory; employing a plurality of cores performing an operation based on the firmware loaded in the volatile memory; and using a core in a standby state or an idle state, among the plurality of cores, to check whether an error has occurred in the volatile memory loaded with the firmware.

In another embodiment, a memory system can include a memory device suitable for storing firmware, a memory, and a plurality of cores suitable for controlling the memory device to perform one or more operations based on the firmware loaded from the memory device into the memory. Some of the cores may detect, during an idle state or standby state thereof, a defect within the loaded firmware in stages. The cores can cooperatively scan the loaded firmware to find the defect.

Embodiments of the disclosure are described below with reference to the accompanying drawings, wherein like numbers reference like elements.

FIG. 1 shows a memory system in accordance with an embodiment of the disclosure. For example, a memory system 110 may be embodied in, or part of, a computing device or a mobile device. The memory system 110 may be operatively engaged with a host 102 (see FIGS. 2, 3 and 9) to transfer to, or receive from, the host 102 a piece of data.

Referring to FIG. 1, the memory system 110 may include a controller 130 and a memory device 150. The controller 130 receives data requested by the host 10 from the memory device 150 and outputs that data to the host 10 or stores data received from the host 10 into the memory device 150 in order to perform command operations requested from the host 10. The memory device 150 includes a plurality of memory blocks including plural memory cells each capable of storing one or more bits of data. For example, the internal configuration of the memory device 150 may be changed in accordance with the characteristics of the memory device 150, the purpose(s) for which the memory system 110 is used, the specification of the memory system 110, performance required by the host 10, or the like.

According to an embodiment, the physical configuration of the controller 130 may be composed of at least one processor, at least one memory, at least one input/output port, and a wiring for electrical connection between the above-mentioned components.

Through plural channels and plural ways, the controller 130 and the memory device 150 may exchange metadata and user data with each other. For example, the user data includes data to be stored by a user through the host 10, and the metadata includes system information (e.g., map data) necessary for storing and managing the user data in the memory device 150. The user data and the meta data may be processed or managed in different ways in the controller 130 because the properties of the user data and meta data are different from each other.

As a storage capacity of the memory device 150 increases, the size of state information also increases. Such state information may include system information, map information, and/or operation information necessary for operations such as reading, programming, and erasing data within the dies, blocks, or pages in the memory device 150. It is difficult for the controller 130 to store all the state information in the memory 114. Thus, the system information, the map information, and the operation information for operation such as reading, programming, and erasing may be stored in the memory device 150, as well as user data. The controller 130 may load, from the plurality of dies or blocks in the memory device 150, some information necessary for operations such as reading, programming, or erasing data from pages in the memory device 150, and then re-store the updated information in the memory device 150 after the corresponding operation is completed.

Although not shown in FIG. 1, as the number of memory cells capable of storing data in the memory device 150 increases, the memory device 150 may include plural memory dies coupled with the controller 130 via plural channels and plural ways. The controller 130 may transmit or receive connection information according to the internal configuration of the memory device 150 together with the data. For example, in a case when a plurality of dies, each including multiple blocks, is included in the memory device 150, there are n channels and m ways (where n or m is an integer greater than 1) between the controller 130 and the memory device 150. The data and the connection information may be transferred via the n channels and the m ways. However, in order for the controller 130 to read or write data to the memory device 150, additional control variables or control signals may be needed depending on the internal structure of the memory device 150. As more dies are included in the memory device 150, additional information required for performing operations becomes larger.

An operation of the controller 130 may be implemented or provided by firmware stored in the memory device 150. When power is supplied to the memory system 110, the firmware stored in the memory device 150 may be loaded in the memory 144 included in, or engaged with, the controller 130. When the firmware is executed, the controller 130 may employ a plurality of cores 192, 194, 196, 198 that perform an internal operation independently. A core can receive instructions and perform calculations or operations to satisfy the instructions. The controller 130 can include the plurality of cores 192, 194, 196, 198. Each core 192, 194, 196, 198 can perform operations separately from the others. Or, the plurality of cores 192, 194, 196, 198 may work together to perform parallel operations on a shared set of data in the memory 144. The firmware may include instructions, software or codes for performing internal operations for data input/output (I/O) operations of the memory system 110. The firmware may be stored in a system area in the memory device 150 during a manufacturing process of the memory system 110. The firmware may be updated as necessary after the memory system 110 is used by a user.

The plurality of cores 192, 194, 196, 198 may be understood as a plurality of processors or a processor 134 (see FIG. 2) included in the controller 130. The processor 134 can be provided with multi cores, e.g., dual-core, quad-core, hexa-core or etc. In order for the memory system 110 to be intelligent or to process a larger amount of data in a faster time, the controller 130 may include a plurality of processors. Each core 192, 194, 196, 198 may execute at least one thread or at least one task. A thread can include a separate set of operations that can be executed on each core 192, 194, 196, 198. The controller 130 may improve data input/output performance of the memory system 110 by employing the plurality of cores 192, 194, 196, 198 based on the firmware. In FIG. 1, the controller 130 includes four cores 192, 194, 196, 198, but the controller 130 can have two or eight cores according to purpose of usage and required performance of the memory system 110.

The memory 144 may be a kind of volatile memory. For example, the memory 144 may include static RAM (SRAM) or dynamic RAM (DRAM). The memory 144 may temporarily store data, information or etc. which is generated through the operation of the firmware and controlled by the controller 130.

In order to stably support an operation of the controller 130, the memory 144 may be managed or maintained without a defect. Or, even if there is a defect, a defect area of the memory 144 may be replaced with a replaceable area. However, while the memory system 110 is operating, a temporary or a permanent failure of the memory 144 may occur due to wear-out, an electromagnetic field, or the like. For example, there is a bit flip error that occurs during the operation of the memory system 110, in a case when the memory 144 has an SRAM structure. In the case of SRAM operating at high speed through switching of transistors, operations of transistors may not be desirably carried out due to the electromagnetic field, which causes a bit flip (or bit flipping) that switches a bit from '0' to '1' or vice versa, i.e., a piece of data stored in a unit cell to change '0' to '1' or vice versa.

If an error occurs in the memory 144, the firmware loaded in the memory 144 may be deformed or distorted. If deformation or distortion of the firmware occurs, it may be difficult for the memory system 110 to perform an operation normally. Further, deformation or distortion of the firmware may raise a problem or an issue. For example, it is difficult to determine whether an operation in the memory system 110 is performed normally or abnormally. When an error is included in the firmware, an execution condition of an operation performed based on the firmware may be changed. In a case when a condition is changed, the controller 130 might not perform an operation that should be performed or might perform an operation that does not need to be performed. By the way of example but not limitation, when a condition for garbage collection may be changed due to a bit flip, garbage collection may be unnecessarily performed, or garbage collection might not be performed even if there are not enough free blocks. In addition, due to an error in the firmware, a specific internal operation might not be performed and may be omitted. For example, if updated information or updated data temporarily stored in the memory 144 is not programmed in the memory device 150, the updated information or the updated data may disappear, thereby lowering operational safety and reliability of the operation in the memory system 110. Therefore, the controller 130 in the memory system 110 needs to confirm whether the firmware loaded in the memory 144 is normally maintained or managed without an error.

Error checking on the firmware loaded in the memory 144 may be performed through the plurality of cores 192, 194, 196, 198 employed by the controller 130. When the plurality of cores 192, 194, 196, 198 perform an error check on the firmware loaded in the memory 144 while the memory system 110 performs a data input/output operation, operational performance (i.e., data input/output (I/O) performance) of the memory system 110 may be adversely affected. Thus, when the plurality of cores 192, 194, 196, 198 are in a standby state or an idle state, error checking on the firmware may be performed to avoid lowering the operational performance. Herein, an operation state may be a kind of operation mode, a kind of state at a specific time, or the like. For example, the standby state may indicate a state where a device temporarily waits for an input or a response to perform a scheduled task, while the idle state may indicate a state where the device is still on but is not executing any task. The standby state may be distinguishable from a sleep mode in which a device is down.

When an error check for the firmware is performed in the idle state of the memory system 110, overheads against data input/output (I/O) operations of the memory system 110 might not occur. However, since it might be impossible to exactly know in advance when a command or a piece of data is entered from the host 102 or an external device, it might be recognized by the memory system 110 whether the duration of a current idle state will be long enough to check an error of the firmware. Accordingly, the plurality of cores 192, 194, 196, 198 employed by the controller 130 may individually perform an error check on a part of the firmware while in a standby state of the corresponding core, and store a result of the error check.

For example, while the first core 192 employed by the controller 130 performs a task for a data input/output operation or a background operation, the first core 192 may be in the standby state and wait for a result or a response of a task performed by the second core 194. While the first core 192 in the standby state without performing any task, the first core 192 may be utilized to perform an error check on the firmware loaded in the memory 144. Typically, a waiting time for a specific core to receive a result or a response from another core may not be long. During the waiting time, the specific core does not perform any action or task, so that the specific core can carry out a checksum on a part of the firmware and store a result of the checksum during the waiting time, i.e., in the standby state.

A checksum is a small-sized datum derived from a block of digital data for the purpose of detecting errors that may have been introduced during its transmission or storage. The checksum can be used to detect an error that may have occurred during transmission or storage and verify data integrity. A checksum procedure may include processes for generating a checksum when transmitting or storing data and verifying the checksum when receiving or using the data. For example, when a first apparatus transmitting data transmits that data (data's sum=T) and checksum (−T) together, a second apparatus receiving the data may add data's sum (T) and checksum (−T) received along with the data. If the complement of '1' in a result of the addition is 0, it can be determined that there is no error. In addition, the memory system 110 may use a cyclic redundancy check (CRC) as a form of checksum.

Depending on internal configurations and performance of the memory system 110, a size of the firmware may vary. The firmware may be divided into plural parts, each having a set size. A core in the standby state may individually perform a checksum on a different part of the firmware. When performing a checksum on the entire firmware, the time required to complete the checksum may be long. Therefore, when the controller 130 performs a checksum on a part of the firmware through a core being not only the idle state but also the standby state among the plurality of cores 192, 194, 196, 198 employed by the controller 130, the controller 130 using a core in the idle state can reduce a time required to perform a checksum on the entire of the firmware. When the controller 130 effectively utilizes the idle or standby resources to check an error on the firmware loaded in the memory 144 and checks the error on the firmware periodically or occasionally, operational safety and reliability of the memory system 110 may be improved or enhanced.

As described above, when the controller 130 performs a checksum on a part of the firmware by using a core in not only the idle state but also the standby state among the plurality of cores 192, 194, 196, 198 employed by the controller 130, it is necessary to store, in a separate space, results of checksums on each part of the loaded firmware and position data indicating a location where the checksum has been performed within each part (e.g., offset information that has been checked so far within each part). Among the plurality of cores 192, 194, 196, 198, a core being not only in the idle state but also in the standby state can check, through the results and the position data stored in the separate space, a position where the checksum has been performed within the part corresponding to the core within the loaded firmware before performing a checksum on another part of the firmware on which a checksum is not performed. After the checksum is performed, a result of the checksum can be stored. The memory device 150 has a checksum reference value stored in advance when the firmware is installed. After the checksum on the entire firmware is carried out, an idle state core among the plurality of cores 192, 194, 196, 198 can compare the result of the checksum on the entire firmware with the checksum reference value so as to determine whether there is an error on the loaded firmware.

After the controller 130 checks an error through a plurality of cores 192, 194, 196, 198 employed by the controller 130, the controller 130 may notify to the host 102 an operational state to correct the error or to prevent a malfunction due to the error. For example, the controller 130 notifies the host 102 that an internal operation of the memory system 110 is stopped or halt to avoid malfunction or abnormal operation, so as to cause the host 102 to issue a reset command to the memory system 110. Based on controller's notification, the host 102 may send the reset command, as well as determine that an operation regarding a command and a piece of data transmitted to the memory system 110 is not normally achieved or completed. Then, the host 102 can send again the not-yet-completed commands and data to the memory system 110 after the memory system 110 is reset. Through this procedure, even if an error occurs in the loaded firmware in the memory system 110, it could be avoided that the memory system 110 may perform a malfunction.

Figure 2:
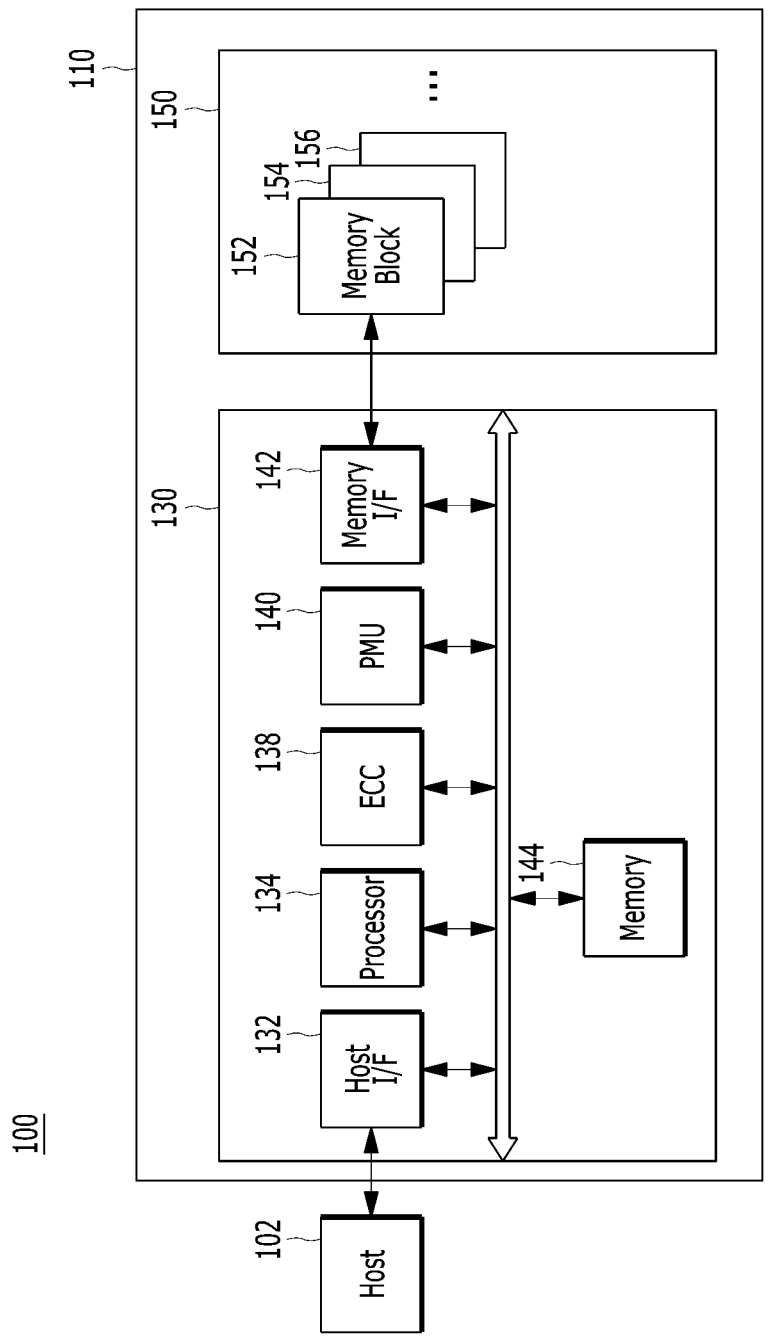
FIG. 2 shows a data processing system including a memory system in accordance with another embodiment of the disclosure.

Referring to FIG. 2, a data processing system 100 in accordance with an embodiment of the disclosure is described. Referring to FIG. 2, the data processing system 100 may include a host 102 engaged or coupled with a memory system 110.

The host 102 may include, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS may include a general operating system and a mobile operating system according to mobility of the host 102. The general operating system may be split into a personal operating system and an enterprise operating system according to system requirements or a user's environment. But the enterprise operating systems can be specialized for securing and supporting high performance. The mobile operating system may be subject to support services or functions for mobility (e.g., a power saving function). The host 102 may include a plurality of operating systems. The host 102 may execute multiple operating systems operably engaged with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command inputted from the host 102. For example, the controller 130 may perform a read operation to provide a piece of data read from the memory device 150 to the host 102, and perform a write operation (or a program operation) to store a piece of data inputted from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components included in the controller 130 may vary according to implementation, operation performance, or the like of the memory system 110. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The host 102 and the memory system 110 may include a controller or an interface for transmitting and receiving a signal, a piece of data, and the like, under a specific protocol. For example, the host interface 132 in the memory system 110 may include an apparatus capable of transmitting a signal, a piece of data, and the like to the host 102 or receiving a signal, a piece of data, and the like inputted from the host 102.

The host interface 132 included in the controller 130 may receive a signal, a command (or a request), or a piece of data inputted from the host 102. That is, the host 102 and the memory system 110 may use a specific protocol to exchange data. Examples of protocols or interfaces supported by the host 102 and the memory system 110 for exchanging data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a kind of layer for exchanging data with the host 102 and is implemented with, or driven by, firmware called a host interface layer (HIL).

The Integrated Drive Electronics (IDE) or Advanced Technology Attachment (ATA), which may be used as an interface for transmitting and receiving data, may use a cable including 40 wires connected in parallel to support data transmission and reception between the host 102 and the memory system 110. When a plurality of memory systems 110 are connected to a single host 102, each of plurality of memory systems 110 may be designated as a master or a slave by using a position or a dip switch to which the plurality of memory systems 110 are connected. have. The memory system 110 set as the master may be used as the main memory device. The IDE (ATA) has evolved into Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for the SATA to be transmitted from one device to another. The SATA has been widely used for data exchange because of its faster data transmission and reception rate and less resource consumption in the host 102. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected, like a device supported by a universal serial bus (USB) even when the host 102 is powered on. For example, in the host 102 having an eSATA port, the memory system 110 may be freely detached like an external hard disk.

The Small Computer System Interface (SCSI) is a kind of serial data communication interface used for connection between a computer, a server, and/or another peripheral device. The SCSI can provide high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. ×1, ×4, ×8, ×16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

According to an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data to be processed in (e.g., outputted from) the memory device 150, which may include an error correction code (ECC) encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in data read from the memory device 150. In other words, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use the parity bit generated during the ECC encoding process, for correcting the error bit(s) of the read data. When the number of error bits is greater than or equal to a threshold number of correctable error bits, the error correction circuitry 138 might not correct error bits but instead may output an error correction fail signal indicating that the error bits are not correctable.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include and all circuits, modules, systems or devices for performing the error correction operation based on at least one of the above described codes.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, to allow the controller 130 to control the memory device 150 in response to a command or a request inputted from the host 102. The memory interface 142 may generate a control signal for the memory device 150 and may process data inputted to, or outputted from, the memory device 150 under the control of the processor 134 when the memory device 150 is a flash memory. For example, when the memory device 150 includes a NAND flash memory, the memory interface 142 includes a NAND flash controller (NFC). The memory interface 142 can provide an interface for handling commands and data exchanged between the controller 130 and the memory device 150. In accordance with an embodiment, the memory interface 142 can be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a sort of working memory in the memory system 110 or the controller 130, while storing temporary or transactional data occurred or delivered for operations in the memory system 110 and the controller 130. For example, the memory 144 may temporarily store a piece of read data outputted from the memory device 150 in response to a request from the host 102, before the piece of read data is outputted to the host 102. In addition, the controller 130 may temporarily store a piece of write data inputted from the host 102 in the memory 144, before programming the piece of write data in the memory device 150. When the controller 130 controls operations such as data read, data write, data program, data erase or like on the memory device 150, the data transmitted or generated between the controller 130 and the memory device 150 of the memory system 110 may be stored in the memory 144. In addition to the read data or write data, the memory 144 may store information (e.g., map data, read requests, program requests, etc.) necessary for performing operations for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control overall operation of the memory system 110. For example, the processor 134 may control a program operation or a read operation of the memory device 150, in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

Further, according to an embodiment, the memory system 110 may be implemented with at least one multi-core processor such as the first to fourth cores 192, 194, 196, 198 shown in FIG. 1. The multi-core processor is a kind of circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command inputted from the host 102. Further, the memory system 110 may be independent of a command or a request inputted from an external device such as the host 102. Typically, an operation performed by the controller 130 in response to the request or the command inputted from the host 102 may be considered a foreground operation, while an operation performed by the controller 130 independently (e.g., regardless or without a request or command inputted from the host 102) may be considered a background operation. The controller 130 can perform the foreground or background operation for read, write or program, erase and the like regarding data in the memory device 150. In addition, a parameter set operation corresponding to a set parameter command or a set feature command as a set command transmitted from the host 102 may be considered a foreground operation. As a background operation performed without a command transmitted from the host 102, the controller 130 may perform garbage collection (GC), wear leveling (WL), bad block management for identifying and processing bad blocks, or the like in the memory device 150.

According an embodiment, substantially similar tasks or operations may be performed as both a foreground operation and a background operation. For example, if the memory system 110 performs garbage collection in response to a request or a command inputted from the host 102 (e.g., Manual GC), garbage collection can be considered a foreground operation. However, when the memory system 110 may perform garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands inputted from the host 102 to improve performance of the memory system 110. For example, the transmitted requests or commands may be directed to, and processed simultaneously, by a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through channel(s) or way(s) in response to requests or commands, plural operations corresponding may be performed simultaneously in parallel. Such a processing method or scheme can be considered as an interleaving method. The interleaving method may improve data I/O performance of the memory system 110.

By way of example but not limitation, the controller 130 can recognize states or statuses regarding channels (or ways) associated with a plurality of memory dies included in the memory device 150. The controller 130 may determine whether each channel or each way is in one of a busy state, a ready state, an active state, an idle state, a normal state and/or an abnormal state. The controller's determination of which channel or way an instruction (and/or a data) is delivered through can be associated with a physical block address, e.g., to which die(s) the instruction (and/or the data) is delivered. The controller 130 can refer to descriptors delivered from the memory device 150. The descriptors can include a block or page of parameters that describe relevant characteristics or properties about the memory device 150. The descriptors are data with a specific format or structure. For instance, the descriptors may include device descriptors, configuration descriptors, unit descriptors, and the like. The controller 130 can refer to, or use, the descriptors to determine with which channel(s) or way(s) an instruction or a data is exchanged.

Referring to FIG. 2, the memory device 150 in the memory system 110 may include the plurality of memory blocks 152, 154, 156. Each of the plurality of memory blocks 152, 154, 156 includes a plurality of nonvolatile memory cells. According to an embodiment, each memory block 152, 154, 156 may include a group of nonvolatile memory cells erased together. Each memory block 152, 154, 156 may include plurality of pages which is a group of nonvolatile memory cells read or programmed together.

Although not shown in FIG. 2, each memory block 152, 154, 156 may have a three-dimensional stack structure for high integration. Further, the memory device 150 may include a plurality of dies, each die including a plurality of planes, each plane including the plurality of memory blocks 152, 154, 156. Configuration of the memory device 150 may vary depending on the required or desired performance of the memory system 110.

Each of the plurality of memory blocks 152, 154, 156 can be any of different types of memory blocks such as a single level cell (SLC) memory block, a multi-level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in view of storage capacity. In an embodiment, the memory device 150 may be implemented with MLC memory blocks such as a double level cell (DLC) memory block, a triple level cell (TLC) memory block, a quadruple level cell (QLC) memory block and a combination thereof. The double level cell (DLC) memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

According to an embodiment, the controller 130 may use a multi-level cell (MLC) memory block in the memory system 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block. In general, nonvolatile memory cells have a feature that does not support data overwrite. However, the controller 130 may use a feature in which a multi-level cell (MLC) may store multi-bit data, in order to program plural pieces of 1-bit data in the MLC a plurality of times. For MLC overwrite operation, the controller 130 may store the number of program times as separate operation information when a piece of 1-bit data is programmed in a nonvolatile memory cell. According to an embodiment, an operation for uniformly levelling threshold voltages of nonvolatile memory cells can be carried out before another piece of data is overwritten in the same nonvolatile memory cells.

In an embodiment of the disclosure, the memory device 150 is embodied as a nonvolatile memory such as a flash memory such as a NAND flash memory, a NOR flash memory and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 3:
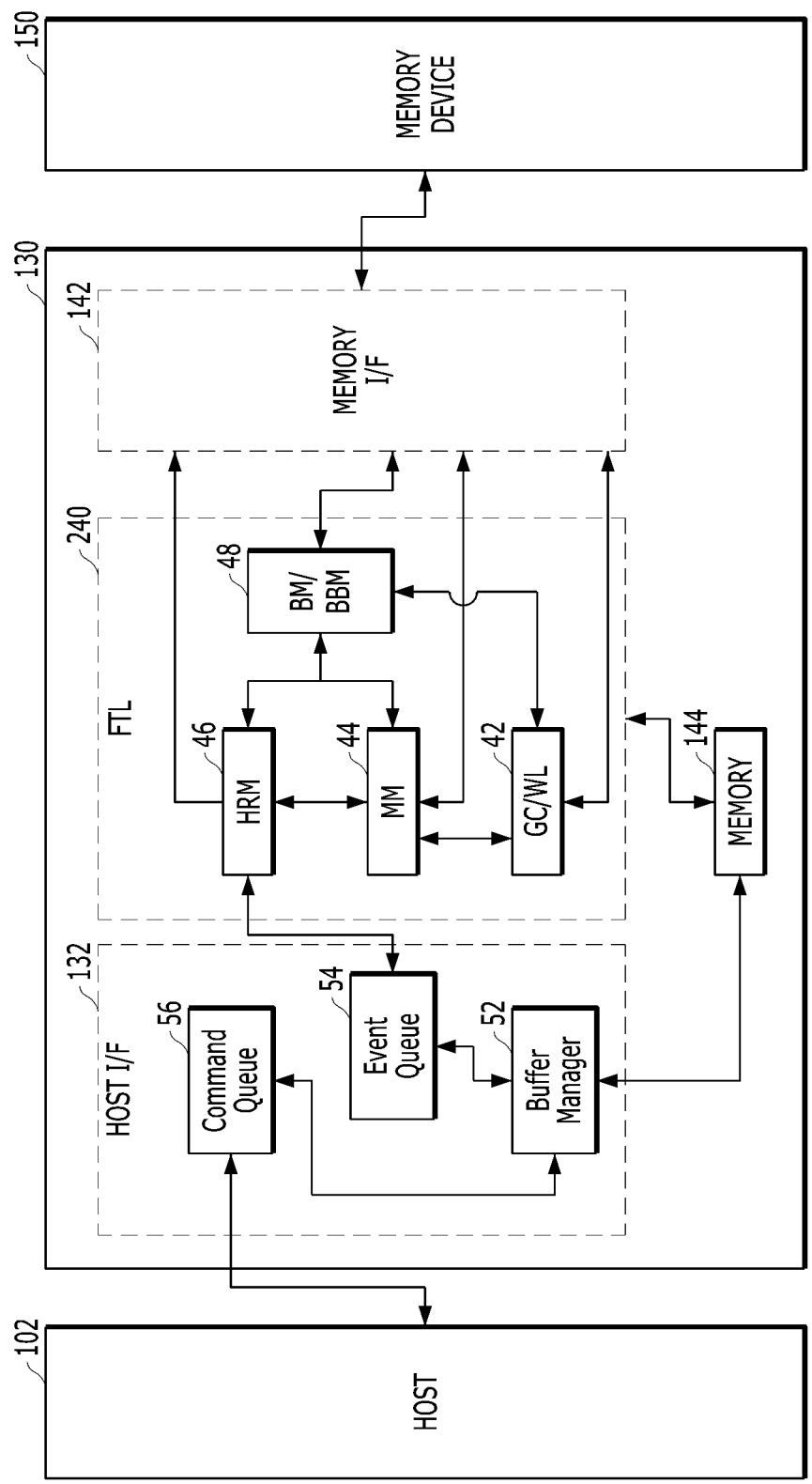
FIG. 3 illustrates a memory system in accordance with another embodiment of the disclosure.

Referring to FIG. 3, a controller in a memory system in accordance with another embodiment of the disclosure is described. The controller 130 cooperates with the host 102 and the memory device 150. As illustrated, the controller 130 includes a host interface 132, a flash translation layer (FTL) 240, as well as the host interface 132, the memory interface 142 and the memory 144 previously identified in connection with FIG. 2.

Although not shown in FIG. 3, in accordance with an embodiment, the error correction circuitry 138 described in FIG. 2 may be included in the flash translation layer (FTL) 240. In another embodiment, the error correction circuitry 138 may be implemented as a separate module, a circuit, firmware or the like, which is included in, or associated with, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands of the same type, e.g., all read or write commands, may be transmitted from the host 102 in a sequence, or commands of different types may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. Further, plural pieces of data of the same type may also be transmitted together, and plural pieces of data of different types may transmitted separately. The host interface 132 may store commands, data, and the like, which are transmitted from the host 102, to the command queue 56 sequentially. Thereafter, the host interface 132 may estimate or predict what kind of internal operation the controller 130 will perform according to the type of commands, data, and the like, which have been entered from the host 102. The host interface 132 can determine a processing order and a priority of commands, data and the like, based at least on their types. According to types of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 240. The event queue 54 receives events, entered from the buffer manager 52, which are to be internally executed and processed by the memory system 110 or the controller 130 in response to the commands, the data, and the like transmitted from the host 102, so as to deliver the events into the flash translation layer (FTL) 240 in the order received.

In accordance with an embodiment, the flash translation layer (FTL) 240 described in FIG. 3 may work as a multi-thread scheme to perform the data input/output (I/O) operations. A multi-thread FTL may be implemented through a multi-core processor using multi-thread, which can employ the first to fourth cores 192, 194, 196, 198 described in FIG. 1.

In accordance with an embodiment, the flash translation layer (FTL) 240 can include a host request manager (HRM) 46, a map manager (MM) 44, a state manager (GC/WL) 42 and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44 to determine a physical address corresponding to the logical address which is entered with the events. The host request manager (HRM) 46 can send a read request with the physical address to the memory interface 142 to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in mapping information used for associating the logical and physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

Figure 4:
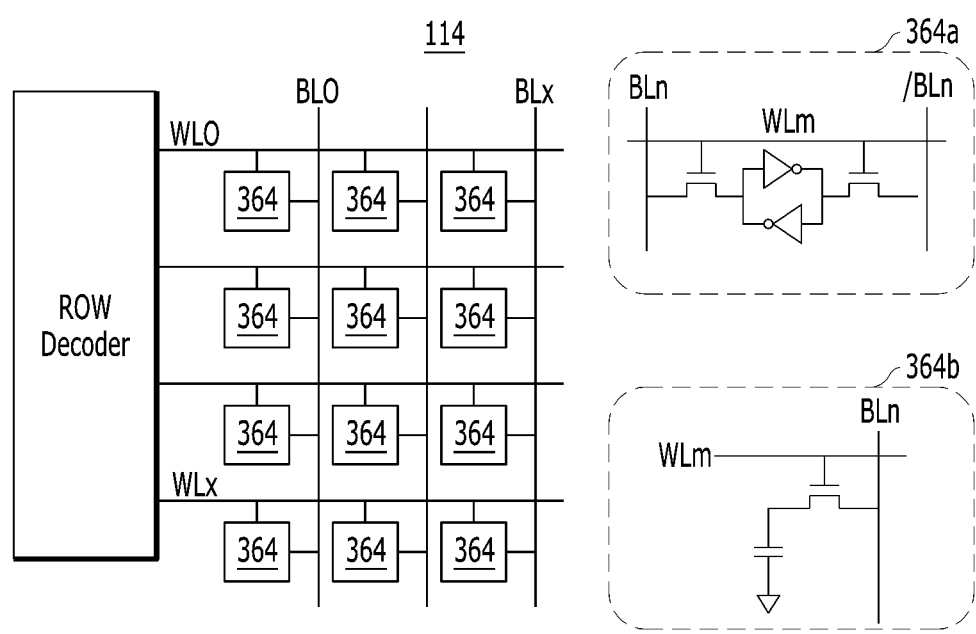
FIG. 4 shows configuration of a memory included in, or engaged with, a controller according to another embodiment of the disclosure.

FIG. 4 shows a memory of a controller 130 in FIGS. 1 to 3. According to an embodiment, the memory may be included in the controller 130. Alternatively, the memory may be electrically connected to the controller 130.

Referring to FIG. 4, the memory 114 may include a plurality of memory cells 364. The plurality of memory cells 364 are individually addressable through a plurality of row addresses corresponding to the plurality of word lines WL0 to WLx and a plurality of column addresses corresponding to the plurality of bit lines BL0 to BLx. Thus, plural pieces of data stored in the plurality of memory cells 364 may be accessed through the plurality of word lines WL0 to WLx and the plurality of bit lines BL0 to BLx. The plurality of memory cells 364 may be conceptually illustrated in a form of a matrix as shown in FIG. 4. However, the form of the matrix of FIG. 4 is conceptual, and the plurality of memory cells 364 including highly integrated elements (e.g., transistors) in the memory 114 may have a planar or a cubic structure, and the structure thereof may be variously modified according to an embodiment.

The plurality of word lines WL0 to WLx may be selectively enabled by a row decoder. The row decoder may supply a voltage to a specific word line that corresponds to an address of data requested during an operation of the controller 130.

According to an embodiment, the memory 114 may be configured with the plurality of memory cells 364 which may have different structures. By way of example but not limitation, the memory cell 364 may include a static random access memory (SRAM) memory cell 364a comprised of a plurality of transistors and an inverter latch. Specifically, the SRAM cell 364a may include a plurality of transistors, as a switch, which are turned on or off via a single word line WLm between a pair of bit lines BLn, /BLn, and an inverter latch that forms a closed loop storing a piece of data between the plurality of transistors.

As another example, the memory cell 364 may include a dynamic random access memory (DRAM) memory cell 364b that includes one transistor and one capacitor. Specifically, the DRAM memory cell 364b may include a transistor serving as a switching transistor that is turned on/off through a single word line WLm and a capacitor capable of storing an amount of charge corresponding to a piece of data. When the transistor is turned on by a voltage applied to the word line WLm, the charge stored in the capacitor may flow into a bit line BLn.

Figure 5:
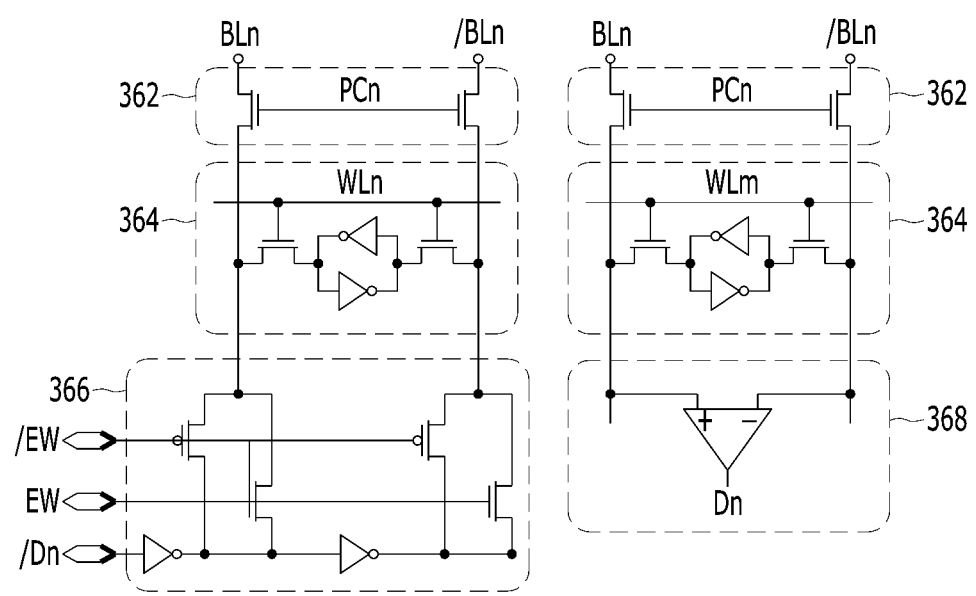
FIG. 5 illustrates a static random access memory (SRAM) according to another embodiment of the disclosure.

FIG. 5 shows a static random access memory (SRAM) in accordance with an embodiment of the disclosure. The SRAM in FIG. 5 may be a part of the memory 114 in FIGS. 1 to 4.

Referring to FIG. 5, a memory cell 364 may be connected to a precharge circuitry 362, and a write driver 366 and/or a read driver 368 via a pair of bit lines BLn, /BLn. Although a single memory cell 364 is shown in FIG. 5, a plurality of memory cells may be connected to the pair of bit lines BLn, /BLn.

The precharge circuitry 362 may include a plurality of transistors as a switching element, which are turned on or off by a precharge signal PCn. The plurality of transistors may be coupled to respective bit lines BLn, /BLn.

According to an embodiment, the write driver 366 may include a plurality of transistors as a switching element, which are turned on or off by write enable signals EW, /EW and at least one inverter to deliver a piece of data. FIG. 5 illustrates an example in which an inverted value (/Dn) of data to be inputted by the user is delivered to the write driver 366. The write driver 366 may be designed to transfer an original value or an opposite value of data depending on the number of inverters in the write driver 366.

Data stored in the memory cell 364 may be transferred to the pair of bit lines BLn, /BLn through a plurality of transistors operating as a switching element, which is turned on by enabling the word line WLm. Two opposite values of the data stored in the memory cell 364 are transferred to the bit lines BLn, /BLn, respectively. In other words, data of the memory cell 364 are delivered to the read driver 368 via the bit lines BLn, /BLn. The read driver 368 may recognize a difference between the two opposite values delivered through the bit lines BLn, /BLn so as to output the data Dn based on the difference.

Figure 6:
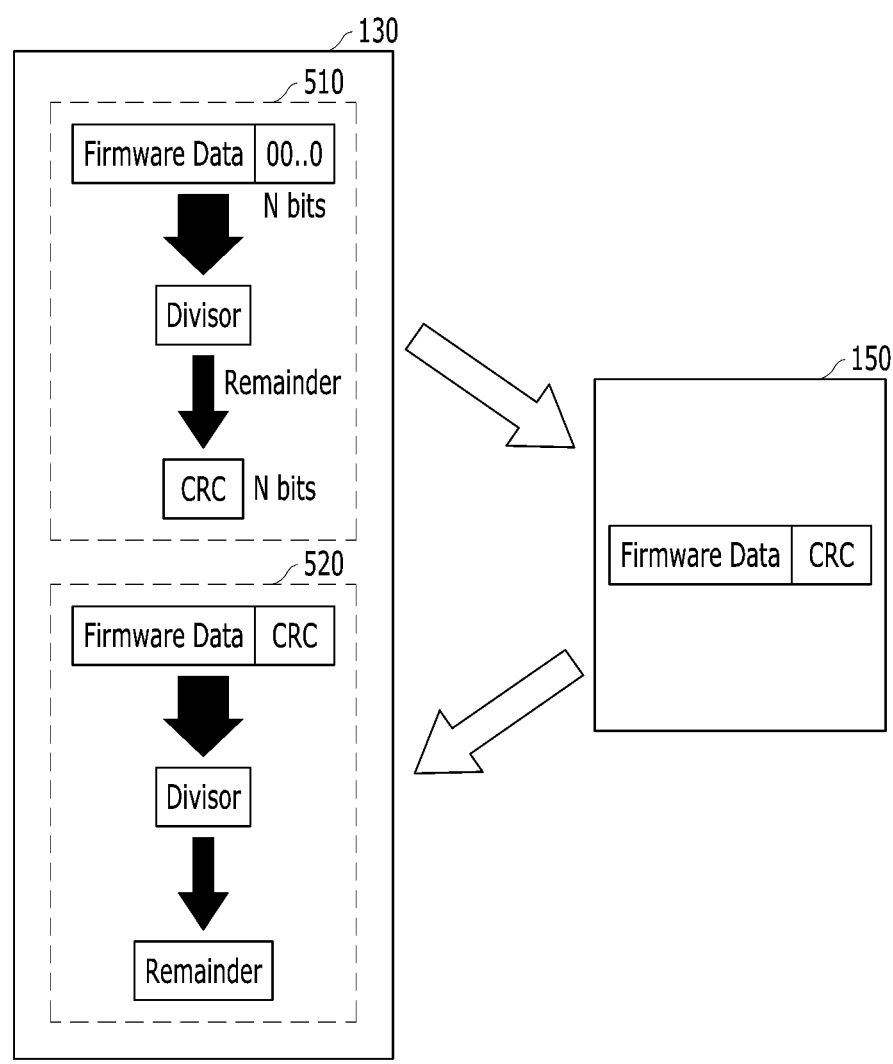
FIG. 6 illustrates an example of a checksum for error check according to another embodiment of the disclosure.

FIG. 6 illustrates an example of a checksum for error check according to another embodiment of the disclosure. In detail, FIG. 6 illustrates an example of checking an error on firmware in a memory system using a cyclic redundancy check method as an embodiment of a checksum.

Referring to FIG. 6, the controller 130 may include an encoder 510 and a decoder 520. For example, the encoder 510 may determine a cyclic redundancy check (CRC) regarding firmware data which is obtained by dividing the firmware into plural units each having a set size. The decoder 520 may use the cyclic redundancy check (CRC) transferred from the memory device 150 to check whether there is an error in the plural units of the firmware data. Herein, the cyclic redundancy check (CRC) is an error-detecting code commonly used in storage devices to detect accidental changes to raw data. Units or blocks of firmware data entering these systems get a short check value attached, based on the remainder of a polynomial division of their contents. According to an embodiment, when the controller 130 includes the encoder 510, a cyclic redundancy check (CRC) may be determined and stored in the memory device 150 with respect to firmware data transmitted from an external source. In another embodiment, when the controller 130 includes the decoder 520 only (without the encoder 510), the cyclic redundancy check (CRC) of the firmware data is stored in the memory device 150 while the memory system 110 is manufactured.

The encoder 510 may allocate N bits for recording a cyclic redundancy check (CRC) regarding the firmware data. For example, a remainder obtained by dividing data, which can be composed of firmware data and the cyclic redundancy check (CRC) of N bits, by a divisor of N+1 bits can be determined as the cyclic redundancy check (CRC) of N bits. The controller 130 may store the data including the firmware data and the cyclic redundancy check (CRC) of N bits in the memory device 150.

The controller 130 may load the data including the firmware data and the cyclic redundancy check (CRC) of N bits from the memory device 150. The decoder 520 may divide the loaded data by using a divisor. For example, when a remainder obtained by dividing the loaded data by the divisor is 0, the decoder 520 may determine that there is no error in the firmware data. On the other hand, if the remainder obtained by dividing the loaded data by the divisor is not 0, the decoder 520 may determine that there is an error in the firmware data.

A size of the firmware stored in the memory device 150 may vary depending on design, configuration, function, and the like of the memory system 110. In addition, a size of the firmware data, which is a unit or block of error checking performed by a core through a checksum, may also vary according to an embodiment.

FIG. 7 describes a memory included in, or engaged with, a controller according to another embodiment of the disclosure. Referring to FIGS. 1 to 3, when firmware stored in the memory device 150 is loaded in the memory 144, the controller 130 may employ the plurality of cores 192, 194, 196, 198 to perform a data I/O operation and an error checking.

Referring to FIG. 7, when the controller 130 employs the plurality of cores 192, 194, 196, 198, the memory 144 may be shared and used by the plurality of cores 192, 194, 196, 198. The memory 144 may be divided into memory segments MS000 to MS215 each having a set size. Depending on storage capacity of the memory 144 and an internal configuration or an operation method of the memory system 110, a size of the memory segment may be different. In FIG. 7, a first region from the first memory segment MS000 to the 102nd memory segment MS101 is allotted to the first core 192, and a second region from the 103th memory segment MS102 to the 204th memory segment MS203 is allotted to the second core 194. In addition, a third region from the 205th memory segment MS204 may be allotted to the third core 196. Sizes of the first to third regions may be the same with, or different from, each other. The first to third regions may be arranged sequentially or randomly in the memory. For example, beginning and ending positions of the first to third regions, such as the first memory segment MS000 and the 102nd (last) memory segment MS101 of the first region, can be changed dynamically in response to an internal command generated at a start, end or reset timing of each operation, or when a core between the plurality of cores 192, 194, 196, 198 requests a space at the memory 144 of the memory system 110.

The plurality of cores 192, 194, 196, 198 based on the firmware may request a space required for performing an operation, and the memory 144 may allocate the required space for each core. When four cores are in operation, the space required by each core can be allocated separately and individually. The region allotted to each core may temporarily store state information, parameters, user data, map information or etc., which is/are generated, updated, or loaded during an operation.

According to an embodiment, when any of the cores 192, 194, 196, 198 is in the standby state or the idle state, it is possible to check whether an error has occurred in a region allotted to each of the cores 192, 194, 196, 198. If an error is found in a specific region allotted to one of the cores 192, 194, 196, 198, the controller 130 may re-schedule an operation which has been performed by the core corresponding to the specific region, to avoid a malfunction. In this case, the controller 130 may assign a rescheduled operation to the same core again, or another core which is in the standby state or the idle state.

According to an embodiment, when a core among the plurality of cores 192, 194, 196, 198 is in the standby state, that core can perform a checksum to check whether an error has occurred and store the result of the checksum. Then, when a core between the plurality of cores 192, 194, 196, 198 is in the idle state, that core may use stored results of the checksum to determine whether there is an error in a region allocated to that core.

According to an embodiment, the firmware loaded in the memory 144 may be shared by the plurality of cores 192, 194, 196, 198. The firmware may be copied or installed in a region allotted to each core 192, 194, 196, 198. In addition, according to an embodiment, the firmware can be divided into a plurality of modules, according to functional characteristics. Some modules of the firmware may individually and independently used by each of the cores 192, 194, 196, 198, and some modules may be shared by the cores 192, 194, 196, 198. In this case, a shared module may be loaded in a shared area of the memory 144. A non-shared module may be individually loaded at each region allotted to the corresponding core within the memory 144.

Figure 8:
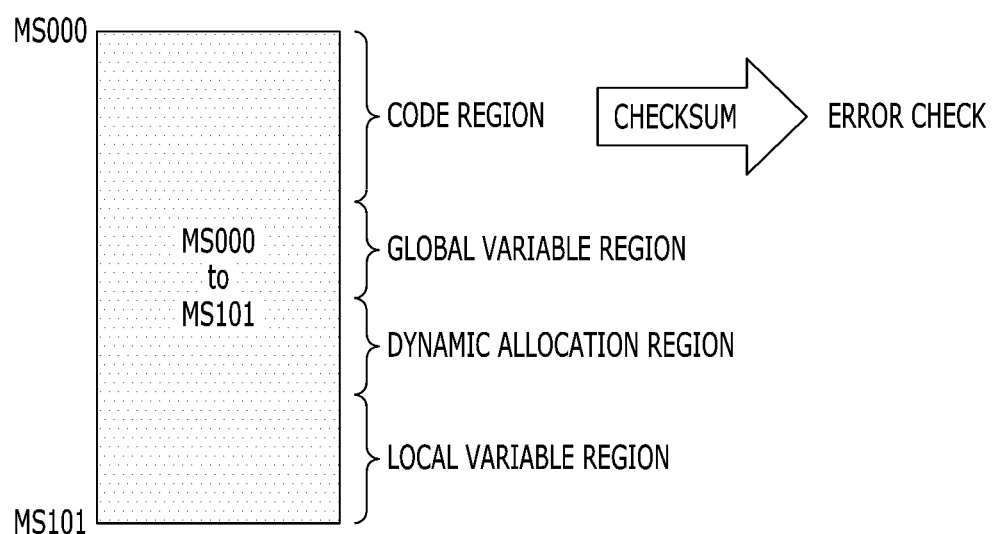
FIG. 8 illustrates an example of usage of a memory used by, or engaged with, at least one core in a controller and an error check, according to another embodiment of the disclosure.

FIG. 8 illustrates an example of usage of a memory used by, or engaged with, at least one core in a controller and an error check, according to another embodiment of the disclosure. Specifically, FIG. 8 illustrates an example in which error checking to the memory 144 is performed when the controller 130 employs a single core.

Referring to FIG. 8, it is assumed that the first memory segment MS000 to the 102nd memory segment MS101 in the memory 144 are allotted to the single core employed by the controller 130. According to an embodiment, a region from the first memory segment MS000 to the 102nd memory segment MS101 may be divided into four sub-regions: a code region, a global variable region, a dynamic allocation region, and a local variable region. The code region is an area in which at least a part of the firmware code executed by the core is stored. The code region may be also called a text area. The core employed by the controller 130 can execute the part of the firmware code loaded in the code region. The global variable (or static variable) region is an area where global variables and static variables that make up data are stored. The global variable region can be allocated when the core employed by the controller starts an operation based on the firmware. When the core employed by the controller 130 takes no further action, the global variable region can be released. In addition, the local variable region is an area in which local variables and parameters related to a function call are stored. The global variable region can be allocated based on the function call and can be released when the function call is completed. The local variable region may be sized when the firmware is configured. According to an embodiment, the local variable region may have a data structure such as a stack. The dynamic allocation area may be a space that is allocated and released as needed while the core employed by the controller 130 performs an operation based on the firmware.

As shown in FIG. 8, the core employed by the controller 130 may partition an allocated region in the memory 144 into sub-regions that are controlled for various purposes or uses, as indicated above. According to an embodiment, the firmware code loaded in the code region may be a target of the checksum for checking an error described with reference to FIGS. 1 to 7. The firmware code loaded in the code region, if there is no error, may not change until a new version of the firmware code is updated. Thus, it is possible to check whether there is an error in the code region of the memory 144 through a simple operation such as the checksum. For example, referring to FIG. 6, when a set unit of the firmware data loaded in the code region includes a cyclic redundancy check (CRC), it is possible to check whether the unit of the firmware loaded in the memory 144 has an error by using the cyclic redundancy check (CRC) in the corresponding unit.

In the global variable region, the dynamic allocation region or the local variable region, data generated, deleted, or modified while the core employed by the controller 130 performs an operation may be stored. However, when the data stored in the global variable region, the dynamic allocation region or the local variable region is not fixed, it might be hard to find whether there are any errors in those regions through the checksum.

Figure 9:
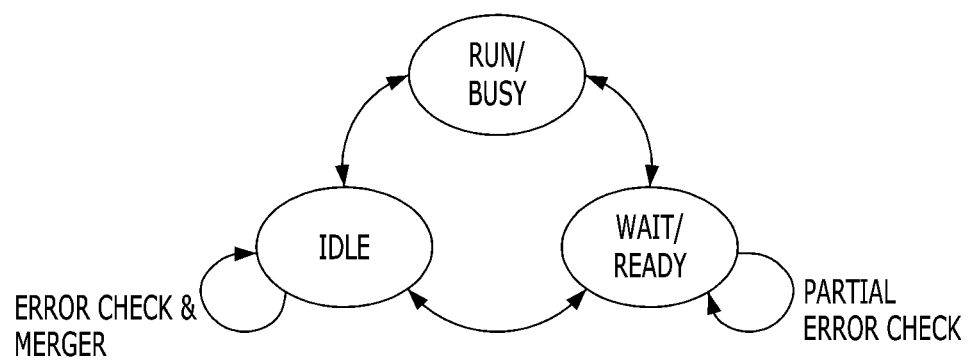
FIG. 9 illustrates operation states of a core of a controller and an error check performed by the core in accordance with another embodiment of the disclosure.

FIG. 9 illustrates operation states of a core of a controller and an error check performed by the core in accordance with another embodiment of the disclosure.

Referring to FIG. 9, a core employed by the controller 130 may be in any of a run/busy state, an idle state, and a wait/ready state. In the run/busy state, the core employed by the controller 130 executes a command related to a data input/output operation corresponding to a command entered from a host 102 or performs a background operation without instruction from the host 102.

The wait/ready state may indicate that the core employed by the controller 130 is waiting for a response or a result transferred from another core or another component in the memory system 110. Herein, the wait/ready state may be referred as to the standby state. When a specific core is in the wait/ready or standby state, the core may hold a task and does not perform any new task. Thus, the core in the wait/ready state may perform an error check on part of the firmware loaded in the memory 144 and store the result of such partial error check. Even if the wait/ready state is very short, performing a checksum on a unit or a block having a small size, which is only part of the firmware, does not demand lots of resources so that the overhead for performing such checksum is not overly burdensome.

In the idle state, the core employed by the controller 130 may not perform any tasks. Even though the core in the idle state performs a checksum on the firmware or collects the result of the checksum performed in advance to check whether there is an error with respect to the firmware loaded in the memory 144, significant overhead is not typically required.

As illustrated in FIG. 1, when the controller 130 employs the plurality of cores 192, 194, 196, 198, a core in the wait/ready state among the plurality of cores 192, 194, 196, 198 may perform a checksum on a part of the firmware loaded in the memory 144. For example, the first core in the wait/ready state may perform a checksum on a portion of the firmware, and then store the result of the checksum and information indicating a location within the firmware, e.g., the particular portion of the firmware, where the checksum is completed. When the first core enters the run/busy state, another core (for example, the second core) in the wait/ready state may perform the checksum on another part of the firmware, referring to the location stored by the first core. Another core can perform a checksum on another part of the firmware, and then store the result of the checksum and information indicating a location within the firmware where the checksum is completed.

It is not easy to predict how long a core employed by the controller 130 will remain in the idle state. Thus, when the error check on the firmware loaded in the memory 144 might not be completed while the core is in the idle state, the memory system 110 may be easily exposed to a malfunction. However, in an embodiment of the disclosure, the checksum on parts of the firmware in lieu of the entire firmware loaded in the memory 144 may be carried out by the core in the standby (wait/ready) state among the plurality of cores, and then the core in the idle state can use less resource required to perform the error check on the firmware. This procedure can provide and allow error checking on a part of the firmware so that the core in an idle state can easily complete the error check on the entire firmware, thereby improving or enhancing operational stability and reliability of the memory system 110.

Figure 10:
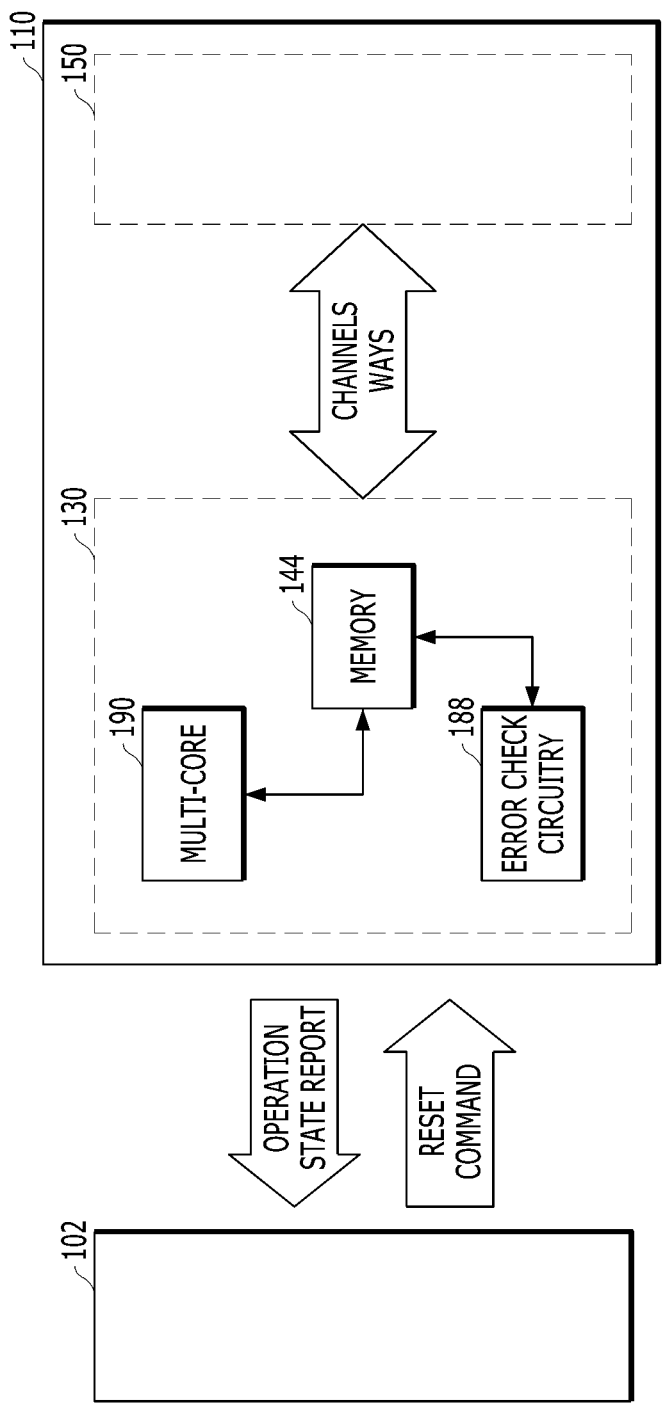
FIG. 10 shows a method for operating an error recovery in a memory system according to another embodiment of the disclosure.

FIG. 10 shows a method for operating an error recovery in a memory system according to another embodiment of the disclosure. Specifically, FIG. 10 illustrates a case where an error occurs in the firmware loaded in the memory 144 and the error cannot be self-recovered through a multi-core 190 employed by the controller 130.

Referring to FIG. 10, the memory system 110 may include the controller 130 and the memory device 150. The controller 130 and the memory device 150 may be connected through a plurality of channels and a plurality of ways. The controller 130 may include the multi-core 190. According to an embodiment, the multi-core 190 may include the plurality of cores 192, 194, 196, 198 described with reference to FIG. 1.

The multi-core 190 may use the memory 144. The controller 130 may divide the memory 144 into various regions, and allocate a space (which may be one or more regions) required by each core included in the multi-core 190. The multi-core 190 may perform an error check on the firmware loaded in the memory 144 through a core in the standby state or the idle state. The plurality of cores in the multi-core 190 can perform a checksum on a part of the firmware loaded in the memory 144 when in the standby state or the idle state, and compare a checksum reference value stored in the memory device 150 with a checksum result. Thus, it can be determined whether there is an error on the firmware loaded in the memory 144.

When the multi-core 190 determines whether there is an error on the firmware loaded in the memory 144, error check circuitry 188 changes an operation state of the memory system 110 based on whether there is an error. The memory system 110 can transmit the changed operation state to the host 102. For example, the host 102 may transmit a Small Computer Systems Interface (SCSI) command such as a read command, a write command, a status check command or the like to the memory system 110. The memory system 110 may transmit a response to the host 102 after performing an operation corresponding to the SCSI command entered from the host 102. If the error check circuitry 188 determines that there is an error in the firmware loaded in the memory 144, the error check circuitry 188 may notify to the host 102 that the memory system 110 is stuck. In an embodiment, the memory system 110 may not transmit a response to the host 102. For example, with respect to a read command received by the memory system 110, one of the multi-cores 190 in the controller 130 can perform an operation corresponding to the read command and transmit data in response to the read command to the host 102 if there is no error. However, when there is an error, the controller 130 may not transmit a response and a piece of data regarding the read command to the host 102, but the error check circuitry 188 may transfer the changed operation state to the host 102. According to an embodiment, when the memory system 110 does not transmit any response in response to a command entered from the host 102, the host 102 may determine that the memory system 110 is in a stuck state.

When the memory system 110 notifies its stuck state to the host 102 or host 102 does not receive a response from the memory system 110 corresponding to a transferred command, the host 102 may judge that the memory system 110 has a problem. The host 102 having determined that the memory system 110 has a problem may transmit a reset command to the memory system 110.

In response to the reset command entered from the host 102, the controller 130 may be reset. Data stored in the memory 144 of the controller 130 may be flushed to the memory device 150 or be deleted. The controller 130 may re-load the firmware stored in the memory device 150 in the memory 144. If the error on the firmware loaded in the memory 144 before the reset is caused by a temporary issue such as a bit flip, the error on the firmware may be recovered by the reset and reload operation of the memory system 110.

According to an embodiment, when a location where an error has occurred is tracked and recorded whenever an error occurs on the firmware loaded in the memory 144, the error check circuitry 188 may detect a permanent defect and replace the permanent defect with another area (e.g., a redundancy area) in the memory 144. In this case, the error check circuitry 188 may avoid allocating an area including the permanent defect in the memory 144 for an operation or a core, so as to improve operational reliability and safety of the memory system 110.

Figure 11:
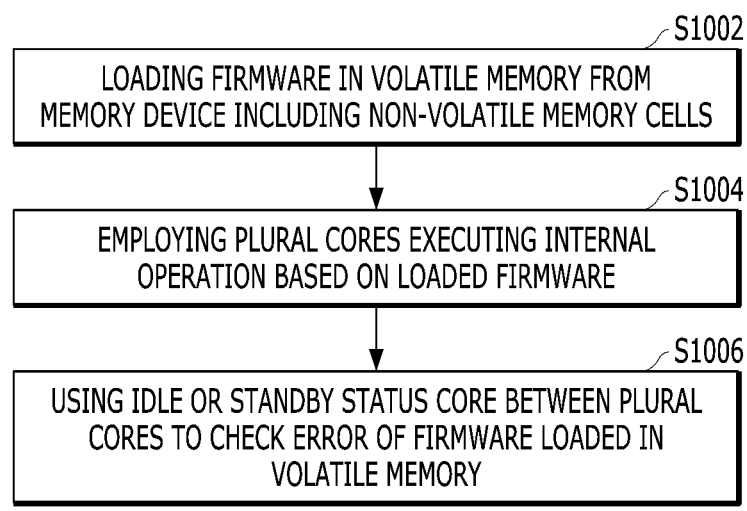
FIG. 11 illustrates a first example of an operation method of a memory system according to another embodiment of the disclosure.

FIG. 11 describes a first example of an operation method of a memory system according to another embodiment of the disclosure.

Referring to FIG. 11, a method for operating a memory system may include loading firmware, stored in a memory device including nonvolatile memory cells, into a volatile memory (S1002), employing a plurality of cores to perform an internal operation based on the loaded firmware (S1004), and using a core in the idle or standby state among the plurality of cores to check an error on the firmware loaded in the volatile memory (S1006). When at least one core among the cores is in the standby state, the corresponding core can perform an error check on a part of the firmware loaded in volatile memory. When the corresponding core is in the active/busy state, another core in the standby state can perform an error check on another part of the firmware.

Through these processes, the memory system can effectively utilize idle or standby resources to check for errors on the entire firmware loaded in the volatile memory, and can reduce an adverse impact that such checks may impose on data input/output (I/O) speed and data input/output (I/O) performance of the memory system.

Although not shown, the method for operating the memory system may further include notifying the host that the internal operation is stopped in response to the error. For example, when the error is found on the firmware loaded in the volatile memory of the memory system, the memory system may notify the host that the memory system is stuck. In addition, according to an embodiment, the memory system may obstruct or block a response transmitted to the host, which corresponds to a completed operation, in order that the host may judge or determine that the memory system is in a stuck state. In addition, the method for operating the memory system may further include re-loading firmware from the memory device in response to a reset command inputted from the host. When the error found in the firmware loaded in the volatile memory is due to a temporary occurrence (e.g., bit flipping) in the volatile memory, the error may be recoverable through re-loading.

Although not shown, the step of checking whether there is an error on the firmware (S1006) may include performing a checksum on a part of the firmware loaded in the volatile memory through a core in the standby state, and then storing a first result of the checksum. A size of the firmware loaded in the volatile memory may vary depending on an internal configuration and an operation method of the memory system. Instead of performing the checksum on the whole firmware at one time, the firmware can be divided into small units, and a standby state core can perform a checksum on a part of the firmware, which is covered based on an available operation margin (e.g., an available time in the standby state), and store a result of the checksum.

Further, the step of checking whether there is an error on the firmware (S1006) may further include using a core in the idle state to perform a checksum on another part of the firmware loaded in the volatile memory, which has not been previously checked through the core in the standby state. The core in the idle state can store a second result of the checksum. The idle state core may compare the first result and the second result with a reference value to determine whether there is an error on the firmware loaded in the memory. When the checksum on a part of the firmware is performed through the core in the standby state, resources may be effectively utilized to perform an error check on the entire firmware loaded in the volatile memory.

On the other hand, the method for operating the memory system may further include the step of stopping an operation to check whether there is an error on the loaded firmware when any input relating to data input/output operations is delivered into a core in the standby state or the idle state and performing the error check. When the core transitions from the standby state, while performing a checksum on a part of the firmware, to the active/busy state, the checksum operation is stopped.

According to an embodiment, the method for operating the memory system may further include using the core in the standby state and the idle state to perform a checksum on the firmware in a unit having a set size and store a result of the checksum and a location where a checksum on the firmware has been performed. As a checksum is performed on a small unit of the firmware, it may be easier to utilize a core in a standby state for performing an error check on the firmware. When there are plural cores in the standby state or the idle state among the plurality of cores, checksums on different parts of the firmware may be individually and separately performed, and plural results of the checksums may be stored. After the checksums are performed on parts of the firmware, the results of the checksums on the parts of the firmware may be collected and summed as a result of checksum on the entire firmware.

Figure 12:
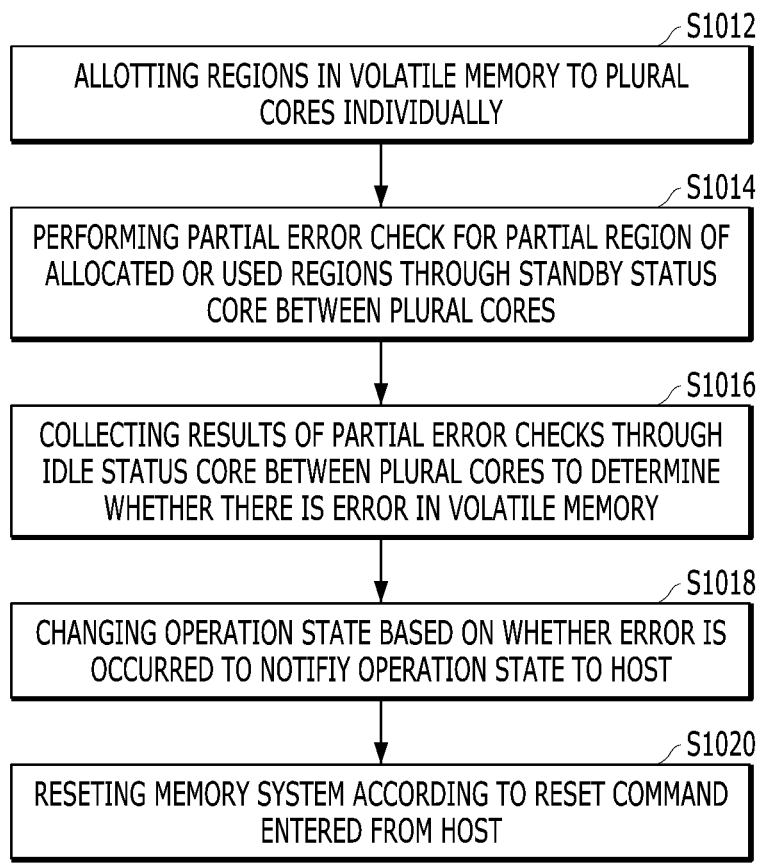
FIG. 12 illustrates a second example of an operation method of a memory system according to another embodiment of the disclosure.

FIG. 12 illustrates a second example of an operation method of a memory system according to another embodiment of the disclosure.

Referring to FIG. 12, a method of operating a memory system may include allocating regions, requested by respective cores, in a volatile memory to the plurality of cores (S1012), performing partial error check(s) on one or more of the allocated regions through a core in the standby state among the plurality of cores (S1014), collecting results of partial error check(s) through a core in an idle state among the plurality of cores to determine whether there is an error in the volatile memory (S1016), changing an operation state based on whether the error occurred to notify the host of the changed operation state (S1018). A region in the volatile memory may be allotted to each of the plurality of cores employed by the controller. Each of the plurality of cores may perform an error check operation on the corresponding allocated region in the volatile memory when that core is in the standby state or the idle state.

A region allotted to each core in volatile memory can be determined dynamically. Each core that the controller employs can check an error in the allotted region when in the standby or idle state and attempt to recover any error detected. However, when an error occurs that none of the cores can recover, the controller may notify to the host that the memory system is stuck.

The method for operating the memory system may further include resetting the memory system in response to a reset command entered from the host (S1020). When the host recognizes that the memory system is stuck, the host may transfer the reset command to the memory system. The memory system may reset the volatile memory in response to the reset command inputted from the host and re-load the firmware stored in the memory device including non-volatile memory cells. Through resetting the volatile memory and re-running an operation, the memory system may recover the error that previously occurred in the volatile memory or a malfunction caused by the error.

According to an embodiment of the disclosure, a data processing system, a method for operating the data processing system and a method of controlling an operation in the data processing system can provide a memory system which is capable of verifying the operation to improve operational reliability of the memory system by detecting and recovering an error in a volatile memory supporting the operation of the controller.

In an embodiment of the disclosure, a memory system can maintain the data input/output (I/O) speed and the data input/output (I/O) performance of the memory system even when performing operations of searching for and recovering errors in the memory while data I/O operations are performed in the memory system, thereby improving operational efficiency of the memory system.

While the present invention has been illustrated and described with respect to specific embodiments, it will be apparent to those skilled in the art in light of the present disclosure that various changes and modifications may be made without departing from the spirit and scope of the disclosure as defined in the following claims. The present invention encompasses all changes and modifications that fall within the scope of the claims.

What is claimed is:

1. A memory system, comprising:
a memory device including plural non-volatile memory cells storing firmware; and
a controller configured to load the firmware in a volatile memory and employ a plurality of cores, each capable of performing an operation based on the firmware,
wherein a core, which is in a standby state or an idle state, between the plurality of cores, is configured to check whether an error has occurred in the volatile memory in which the firmware is loaded,
wherein the core in the standby state is further configured to perform checksum on some of the firmware loaded in the volatile memory and store a first result of the checksum,
wherein the core in the idle state is further configured to perform the checksum on a part of the firmware that the core in the standby state does not perform the checksum, and store a second result of the checksum performed on the part of the firmware, and
wherein the core in the idle state is further configured to compare the first and second results with a reference to determine whether the error is found.

2. The memory system according to claim 1, wherein the controller is further configured to stop or halt the operation when the error is found, change an operation state to indicate that the operation is stopped in the memory system, and notify a host of a changed operation state.

3. The memory system according to claim 2, wherein the controller is further configured to re-load the firmware in the volatile memory from the memory device in response to a reset command inputted from the host.

4. The memory system according to claim 1, wherein, the controller is further configured to allot regions in the volatile memory, which are requested by the plurality of cores individually, perform an error check on some of the regions through the core in the standby state, collect a result of the error check to determine whether the error has occurred in the volatile memory through the core in the idle state, change an operation state based on whether the error is found, and notify a host of the changed operation state.

5. The memory system according to claim 1, wherein the controller is further configured to stop or halt a task for finding an error when an input associated with a data input/output operation is assigned to the core in the standby state or the idle state.

6. The memory system according to claim 1, wherein the core in the standby state or the idle state is further configured to perform checksum on a part of the firmware and store a result of the checksum and information indicating a location of the part within the firmware on which the checksum has been performed.

7. The memory system according to claim 1, wherein, when there are cores in the standby state or the idle between the plurality of cores, the cores individually perform checksum on different parts of the firmware to store a result of the checksum.

8. The memory system according to claim 1, wherein the controller includes error check circuitry configured to monitor states of the plurality of cores, and stop an operation which has been performed by one or more cores in response to an error founded in a region of the volatile memory, which is allotted by the one or more cores.

9. A method for operating a memory system, comprising:
loading firmware, which is stored in a memory device including plural non-volatile memory cells, in a volatile memory;
employing a plurality of cores each performing an operation based on the firmware in the volatile memory; and
using a core, which is in a standby state or an idle state, between the plurality of cores, to check whether an error has occurred in the volatile memory in which the firmware is loaded,
wherein the using the core includes:
using a core in the standby state to perform checksum on some of the firmware loaded in the volatile memory, and to store a first result of the checksum;
using the core in the idle state to perform the checksum on a part of the firmware in which the core in the standby state does not perform the checksum, and to store a second result of the checksum performed on the part of the firmware; and
using the core in the idle state to compare the first and second results with a reference to determine whether the error is found.

10. The method according to claim 9, further comprising:
stopping or halting the operation when the error is found;
changing an operation state to indicate that the operation is stopped in the memory system; and
notifying a host of a changed operation state.

11. The method according to claim 10, further comprising:
re-loading the firmware in the volatile memory from the memory device in response to a reset command inputted from the host.

12. The method according to claim 9, further comprising:
allotting regions in the volatile memory, which are requested by the plurality of cores individually; and
changing an operation state based on whether the error has occurred to notify a host of the changed operation state,
wherein the using the core includes:
performing an error check on some of the regions through the core in the standby state; and
collecting a result of the error check to determine whether the error is found in the volatile memory through the core in the idle state.

13. The method according to claim 9, further comprising:
stopping or halting a task for finding an error when an input associated with a data input/output operation is assigned to the core in the standby state or the idle state.

14. The method according to claim 9, further comprising:
using the core in the standby state or the idle state to perform checksum on a particular part of the firmware and store a result of the checksum and information indicating a location within the firmware on which the checksum has been performed.

15. The method according to claim 9, further comprising:
when there are cores in the standby state or the idle between the plurality of cores, using the cores to individually perform checksum on different parts of the firmware to store a result of the checksum.

16. At least one non-transitory computer readable storage medium configured to store instructions that, when executed by at least one processor, cause the at least one processor to carry out tasks that comprise:
loading firmware, which is stored in a memory device including plural non-volatile memory cells, in a volatile memory;
employing a plurality of cores each performing an operation based on the firmware in the volatile memory; and
using a core, which is in a standby state or an idle state, between the plurality of cores, to check whether an error has occurred in the volatile memory in which the firmware is loaded,
wherein the using the core includes:
using a core in the standby state to perform checksum on some of the firmware loaded in the volatile memory, and to store a first result of the checksum;
using the core in the idle state to perform the checksum on a part of the firmware in which the core in the standby state does not perform the checksum, and to store a second result of the checksum performed on the part of the firmware; and
using the core in the idle state to compare the first and second results with a reference to determine whether the error is found.

* * * * *